United States Patent
Kojima et al.

(10) Patent No.: US 10,771,651 B2
(45) Date of Patent: Sep. 8, 2020

(54) IMAGE FORMING APPARATUS AND IMAGE CORRECTION METHOD

(71) Applicant: TOSHIBA TEC KABUSHIKI KAISHA, Tokyo (JP)

(72) Inventors: Takahiro Kojima, Mishima Shizuoka (JP); Jun Ishii, Fujieda Shizuoka (JP); Shunsuke Ando, Mishima Shizuoka (JP); Motoshi Ueda, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/364,758

(22) Filed: Mar. 26, 2019

(65) Prior Publication Data

US 2020/0021707 A1 Jan. 16, 2020

(30) Foreign Application Priority Data

Jul. 10, 2018 (JP) .................................. 2018-130909

(51) Int. Cl.
*H04N 1/00* (2006.01)
*H04N 1/10* (2006.01)
(Continued)

(52) U.S. Cl.
CPC ..... *H04N 1/00978* (2013.01); *H04N 1/00557* (2013.01); *H04N 1/0282* (2013.01); *H04N 1/1052* (2013.01); *H04N 1/1937* (2013.01)

(58) Field of Classification Search
CPC .......... G03G 15/04054; G03G 15/043; G03G 15/2039; G03G 15/5004; G03G 15/657;
(Continued)

(56) References Cited

U.S. PATENT DOCUMENTS 10,377,146 B2 8/2019 Otana
2003/0156184 A1 8/2003 Suzuki et al.
(Continued)

FOREIGN PATENT DOCUMENTS

EP 3335886 A1 6/2018
JP 2010091925 A 4/2010

OTHER PUBLICATIONS

Extended European Search Report dated Dec. 2, 2019, mailed in counterpart European Application No. 19181295.7, 8 pages.

*Primary Examiner* — Negussie Worku
(74) *Attorney, Agent, or Firm* — Kim & Stewart LLP

(57) ABSTRACT

An image forming apparatus comprises a first temperature detector to detect a temperature of a first portion of an optical scanning device in a printer. The first portion is proximate to a heat generating element in the optical scanning device. A second temperature detector is provided to detect a temperature of a second portion of the optical scanning device, which is farther from the heat generating element than the first portion. A controller is configured to perform alignment control for correcting a color positional shift of the printer when either a detected temperature change of the first portion is greater than or equal to a first threshold value or a detected temperature change of the second portion is greater than or equal to a second threshold value.

20 Claims, 10 Drawing Sheets

(51) Int. Cl.
H04N 1/028 (2006.01)
H04N 1/193 (2006.01)

(58) Field of Classification Search
CPC ..... G03G 2215/00772; G03G 15/2064; G03G 21/20; G03G 15/2042; G03G 15/0194; G03G 15/2046; G03G 15/2053; G03G 15/50; G03G 15/5045; G03G 21/02; G03G 21/206; G03G 2215/0135; G03G 2215/0158; G03G 2215/2029; G03G 15/0105; G03G 15/55; G03G 2215/00721; G03G 2215/2038; G06K 15/1214; H04N 1/00978; H04N 1/2346; H04N 1/29; H04N 2201/0082; H04N 13/341; H04N 13/398; H04N 17/002; H04N 5/23241; H04N 5/361; H04N 9/3129; H04N 9/3144
USPC .......................................................... 358/1.9
See application file for complete search history.

(56) References Cited

U.S. PATENT DOCUMENTS

| | | | | |
|---|---|---|---|---|
| 2008/0253786 | A1* | 10/2008 | Isobe | G03G 15/5004 399/69 |
| 2009/0163114 | A1* | 6/2009 | Carpio | H01L 22/26 451/5 |
| 2009/0185816 | A1 | 7/2009 | Miyadera | |
| 2010/0290796 | A1* | 11/2010 | Sato | G03G 15/2039 399/33 |
| 2011/0064440 | A1* | 3/2011 | Saitoh | G03G 15/2042 399/69 |
| 2012/0229494 | A1* | 9/2012 | Kobayashi | G09G 5/397 345/589 |
| 2012/0328310 | A1 | 12/2012 | Ohashi | |
| 2013/0016169 | A1 | 1/2013 | Ohtoshi et al. | |
| 2014/0064766 | A1* | 3/2014 | Saeki | G03G 21/20 399/69 |
| 2015/0160582 | A1* | 6/2015 | Yamazaki | G03G 15/043 347/118 |
| 2015/0241841 | A1* | 8/2015 | Sakurai | G03G 21/206 399/92 |
| 2015/0301471 | A1* | 10/2015 | Nakahata | G03G 15/5058 347/116 |
| 2015/0338764 | A1* | 11/2015 | Kodama | H04N 1/113 347/118 |
| 2016/0041509 | A1* | 2/2016 | Sekiguchi | G03G 15/1675 399/66 |
| 2017/0251129 | A1* | 8/2017 | Sakatani | H04N 1/6091 |
| 2017/0351206 | A1* | 12/2017 | Hamano | G03G 15/0131 |
| 2017/0371267 | A1* | 12/2017 | Taniwaki | G03G 15/04054 |
| 2018/0143559 | A1 | 5/2018 | Omura et al. | |
| 2018/0239130 | A1* | 8/2018 | Ueda | G02B 26/123 |
| 2018/0335736 | A1* | 11/2018 | Saito | G03G 15/2039 |
| 2019/0086845 | A1* | 3/2019 | Hashiguchi | G03G 15/2039 |
| 2019/0286006 | A1* | 9/2019 | Yuasa | G02B 7/008 |
| 2019/0286030 | A1* | 9/2019 | Mita | G03G 15/2039 |
| 2020/0021708 | A1* | 1/2020 | Kojima | H04N 1/0282 |

* cited by examiner

SECTIONAL VIEW ALONG A-A LINE

IMAGE FORMING APPARATUS AND IMAGE CORRECTION METHOD

CROSS-REFERENCE TO RELATED APPLICATION

This application is based upon and claims the benefit of priority from Japanese Patent Application No. 2018-130909, filed Jul. 10, 2018, the entire contents of which are incorporated herein by reference.

FIELD

Embodiments described herein relate generally to an image forming apparatus and an image correction method.

BACKGROUND

In order to realize color printing, the image forming apparatus superimposes images formed by toners of different colors. Here, a color shift in which the superimposition of the different images is not ideal may result when the different toner images are shifted in position from each other because of misalignments of the different imaging units for each. The cause of color shift may be a displacement in each color unit due to the temperature variation of optical scanning devices or the like. For this reason, the image forming apparatus generally corrects colors shift by executing an alignment process when the temperature of an optical scanning device changes by a certain level or more. However, it is desired to further suppress color shifts occurring in image forming apparatuses.

DETAILED DESCRIPTION

Figure 1:
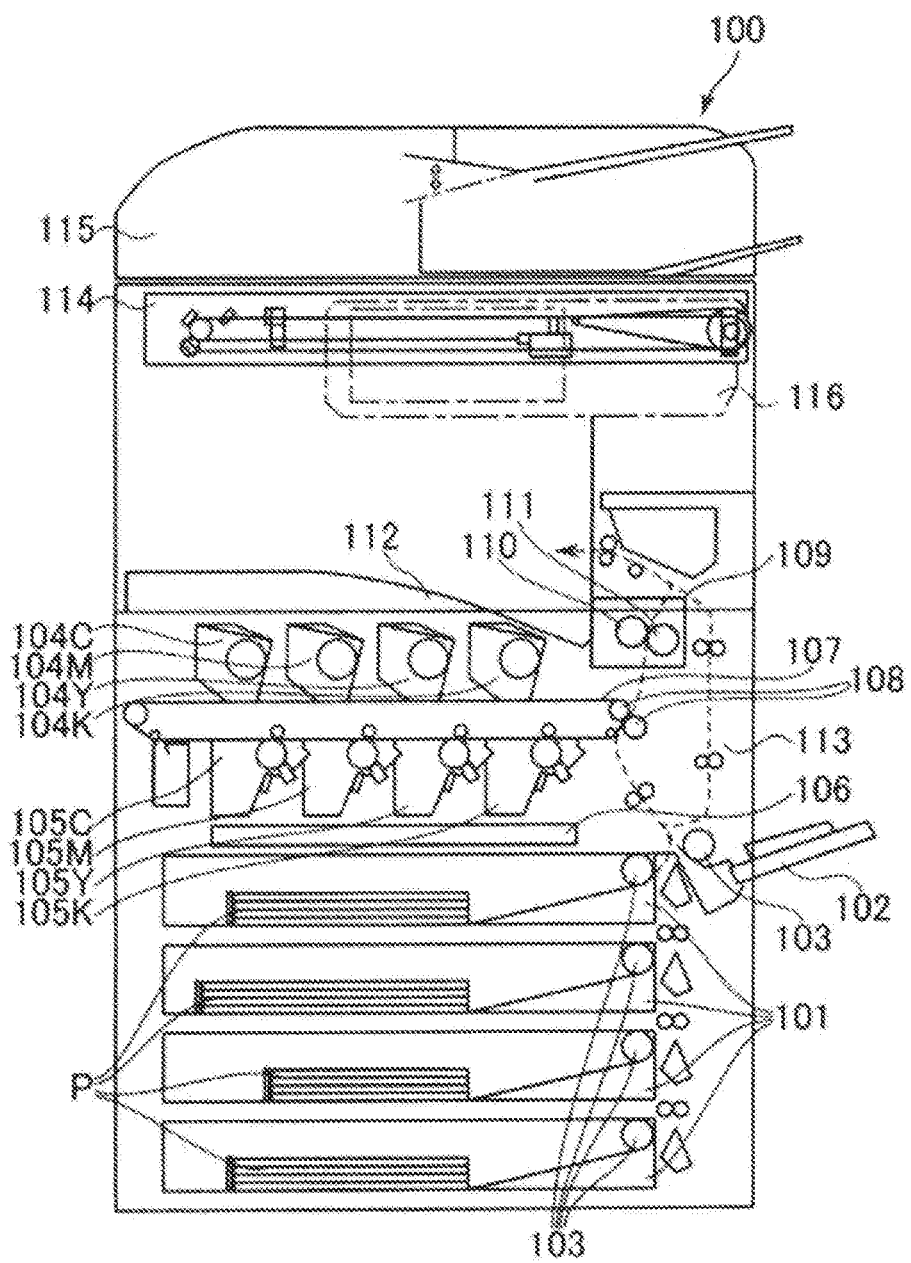
FIG. 1 depicts an image forming apparatus according to a first embodiment and a second embodiment.

In accordance one embodiment, an image forming apparatus comprises a first temperature detector configured to detect a temperature of a first portion of an optical scanning device of a printer unit and a second temperature detector configured to detect a temperature of a second portion of the optical scanning device. The first portion is proximate to a heat generating element, such as a motor or the like, and the second portion is farther from the heat generating element than the first portion. A controller is configured to perform alignment control for correcting a color positional shift of the printer unit when either a detected temperature change of the first portion is greater than or equal to a first threshold value or a detected temperature change of the second portion is greater than or equal to a second threshold value.

Hereinafter, an image forming apparatus according to several example embodiments is described with reference to the accompanying drawings. In the drawings, the scale of each part may be appropriately changed. For convenience of description, various aspects of an actual device may be omitted from the figures.

First Embodiment

FIG. 1 is a diagram schematically illustrating an example of an image forming apparatus 100 according to the first embodiment.

The image forming apparatus 100 performs printing according to an electrophotographic system. The image forming apparatus 100 is, for example, a MFP (multifunction peripheral), a copying machine, a printer, a facsimile, or the like. The image forming apparatus 100 includes, for example, a printing function, a scanning function, a copying function, a facsimile function, and the like. The printing function is a function of performing printing according to the electrophotographic system. Specifically, the printing function is a function of forming an image using a toner on an image forming medium P or the like. The image forming medium P is, for example, a sheet of paper. In some examples, the image forming medium P may be referred to as paper P or sheet P for simplicity. The scanning function is a function of reading an image from a document on which the image has been formed. The copying function is a function of printing an image read from the document using the scanning function on the image forming medium P. For example, the image forming apparatus 100 includes a paper feed tray 101, a manual feed tray 102, a paper feed roller 103, a toner cartridge 104C, 104M, 104Y, 104K, an image forming section 105C, 105M, 105Y, 105K, a transfer belt 107, a transfer roller 108, a fixing section 109, a heating section 110, a pressure roller 111, a paper discharge tray 112, a duplex unit 113, a scanning section 114, a document feeder 115 and a control panel 116.

The paper feed tray 101 accommodates the image forming medium P used for printing.

The manual feed tray 102 is a plate-like element used for manually feeding an image forming medium P.

The paper feed roller 103 rotates by an operation of a motor to convey the image forming medium P accommodated in the paper feed tray 101 or the manual feed tray 102 from the paper feed tray 101 or the manual feed tray 102.

The toner cartridges 104C, 104M, 104Y, 104K store toner to be supplied to the image forming section 105C, 105M, 105Y, 105K. The image forming apparatus 100 includes a plurality of toner cartridges. For example, the image forming apparatus 100 includes four toner cartridges (a toner cartridge 104C, a toner cartridge 104M, a toner cartridge 104Y and a toner cartridge 104K), as shown in FIG. 1. The toner cartridges 104C, 104M, 104Y and 104K store toners corresponding to respective CMYK colors (cyan, magenta, yellow, and key (black)). The color of the toner stored in the toner cartridges is not limited to CMYK colors, but may instead be any other color. The toner may be a special toner. For example, a decolorable toner which becomes decolored at a temperature higher than some predetermined temperature threshold may be used.

The image forming sections 105C, 105M, 105Y, 105K each comprise a developing device and a photoconductive drum. The developing device develops an electrostatic latent image on a surface of the photoconductive drum using a toner supplied from the toner cartridge (104C, 104M, 104Y, 104K). As a result, a toner image is formed ("developed") on the surface of the photoconductive drum. The toner image formed on the photoconductive drum surface is transferred onto the transfer belt 107 (referred to as primary transfer). The image forming apparatus 100 includes a plurality of the image forming sections. For example, the image forming apparatus 100 comprises four image forming sections (an image forming section 105C, an image forming section 105M, an image forming section 105Y and an image forming section 105K), as shown in FIG. 1. The image forming section 105C, the image forming section 105M, the image forming section 105Y and the image forming section 105K form images by using supplied toners corresponding to respective CMYK colors.

Figure 2:
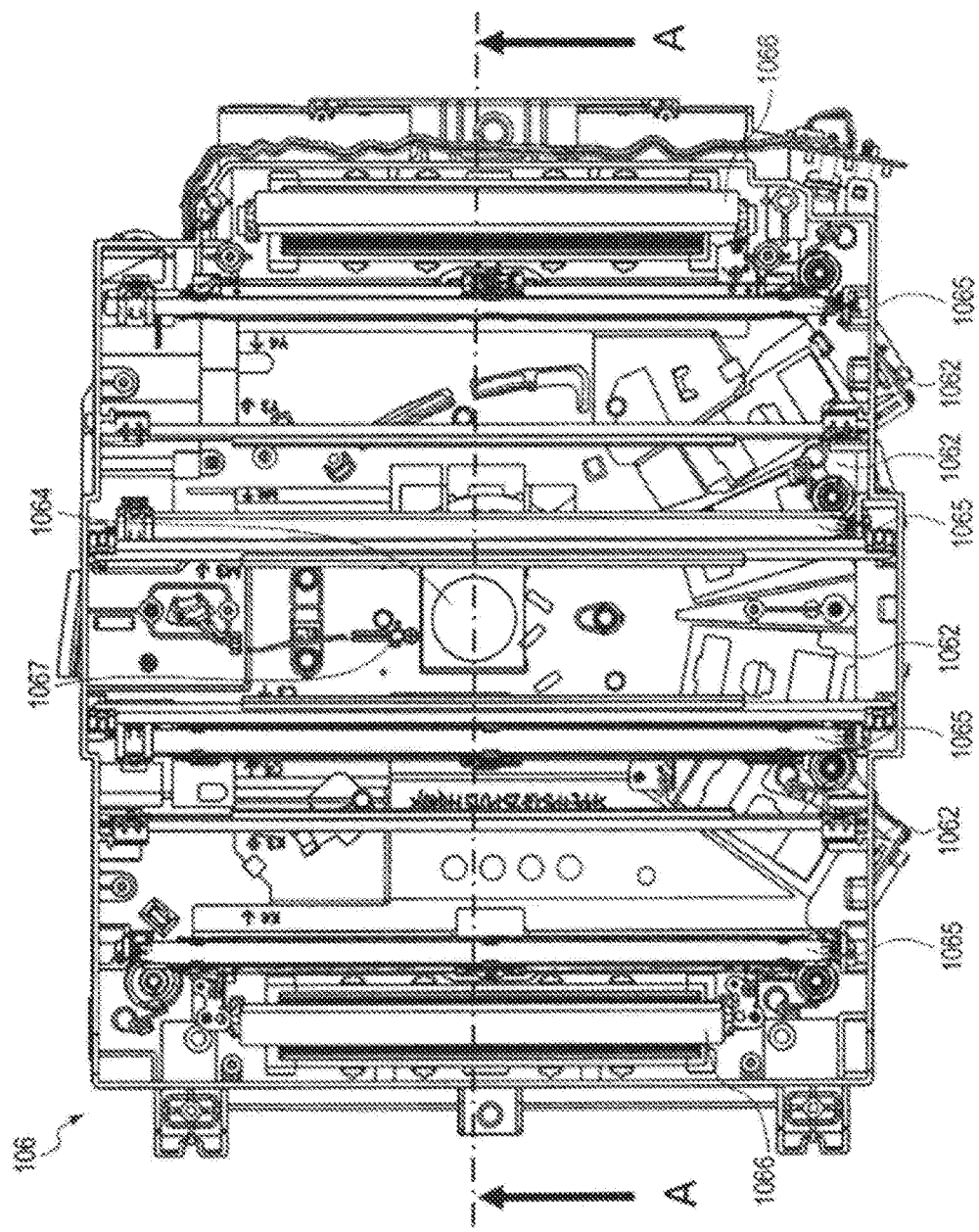
FIG. 2 is a top view illustrating an example of an optical scanning device.
Figure 3:
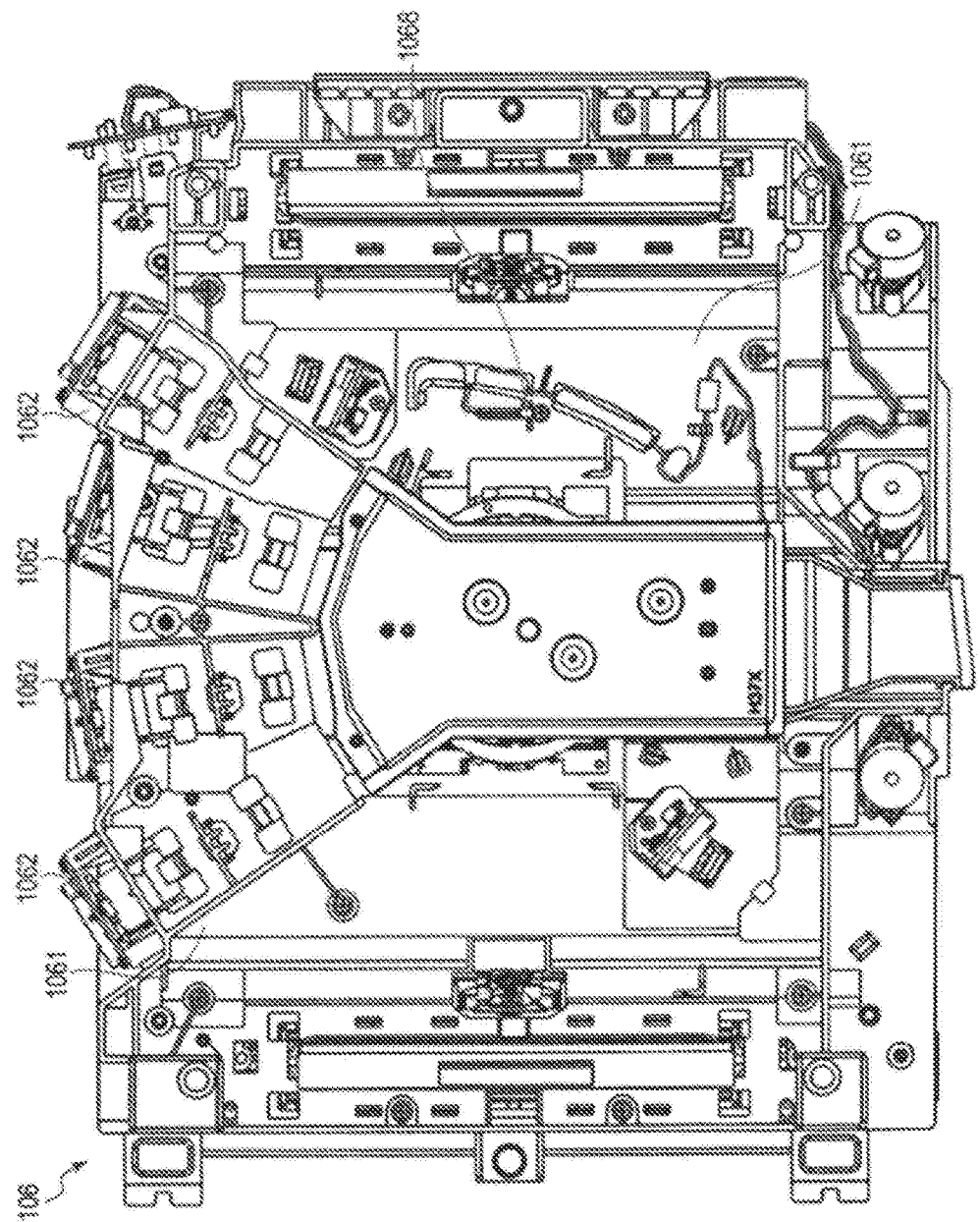
FIG. 3 is a bottom view illustrating an example of an optical scanning device.
Figure 4:
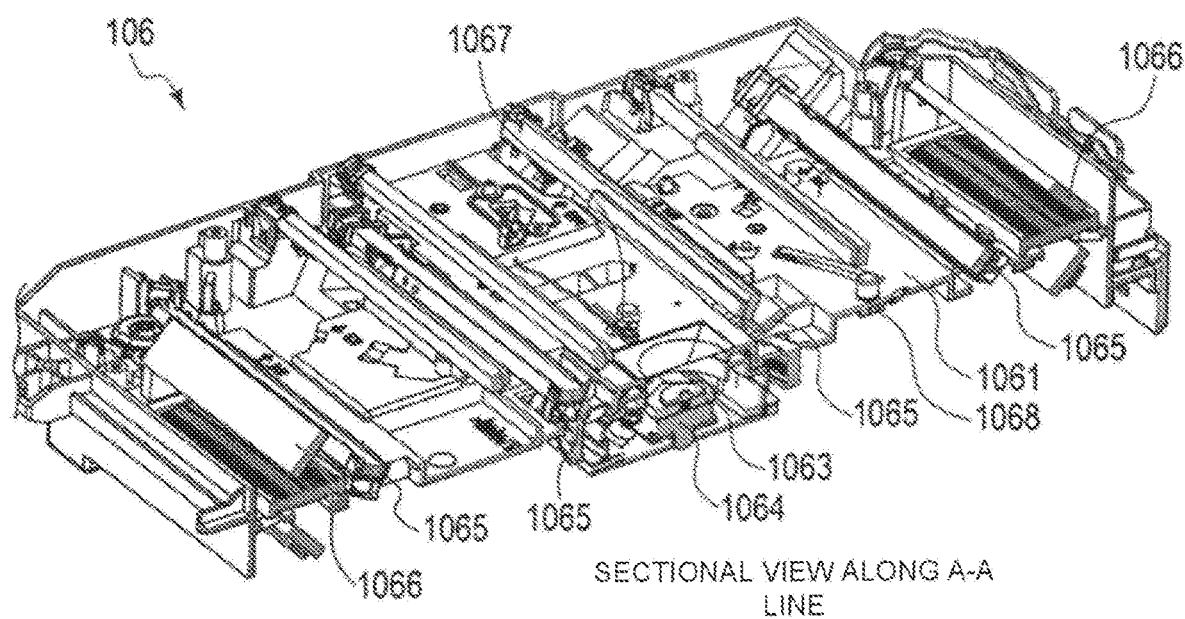
FIG. 4 is a cross-sectional perspective view illustrating an example of an optical scanning device.

An optical scanning device 106 is described with reference to FIG. 2 to FIG. 4. FIG. 2 is a top view illustrating an example of the optical scanning device 106. FIG. 3 is a bottom view illustrating an example of the optical scanning device 106. FIG. 4 is a cross-sectional perspective view illustrating an example of the optical scanning device 106. FIG. 4 is a cross-sectional view taken along a line AA in FIG. 2.

The optical scanning device 106 is also referred to as an LSU (Laser Scanning Unit) or the like. The optical scanning device 106 forms the electrostatic latent image on the surface of the photoconductive drums of each image forming section 105C, 105M, 105Y, 105K using a laser beam controlled according to image data. For example, the optical scanning device 106 includes a housing 1061, a laser unit 1062, a polygonal mirror 1063, a motor 1064, a mirror 1065, a lens 1066, a first temperature sensor 1067, and a second temperature sensor 1068.

The housing 1061 supports the laser unit 1062, the polygonal mirror 1063, the motor 1064, the mirror 1065, the lens 1066, the first temperature sensor 1067, and the second temperature sensor 1068. The housing 1061 is made of resin, for example.

The optical scanning device 106 includes, for example, one laser unit 1062 for each CMYK color (i.e., one laser unit 1062 per imaging forming section). Each laser unit 1062 emits a laser beam. Each laser unit 1062 controls emission of the laser beam according to a control signal corresponding to the image data. Each laser unit 1062 modulates the laser beam according to the control signal corresponding to the image data.

The polygonal mirror 1063 reflects the laser beam emitted from each laser unit 1062. The polygonal mirror 1063 is rotated by the motor 1064 to reflect each laser beam for performing scanning.

The motor 1064 rotates the polygonal mirror 1063. Heat generated from the motor 1064 is a main factor in raising the temperature of the optical scanning device 106. Therefore, the motor 1064 is an example of a heat generation element.

The mirror 1065 and the lens 1066 are optical elements for manipulating the laser beam.

The mirror 1065 is provided in such a manner that a position or an angle thereof with respect to the housing 1061 can be adjusted.

The first temperature sensor 1067 measures a temperature of a portion where it is installed. The first temperature sensor 1067 outputs the measured temperature. The first temperature sensor 1067 is, for example, a thermistor. This is because the thermistor is a relatively inexpensive temperature sensor. For example, the first temperature sensor 1067 is installed near the motor 1064 in the housing 1061, as shown in FIG. 2.

The first temperature sensor 1067 is an example of a first temperature detection section that detects a temperature of a portion near the heat generation element of the optical scanning device 106.

The second temperature sensor 1068 measures a temperature of a portion where it is installed. The second temperature sensor 1068 outputs the measured temperature. The second temperature sensor 1068 is, for example, a thermistor. This is because the thermistor is a relatively inexpensive temperature sensor. The second temperature sensor 1068 is installed in the housing 1061. However, the second temperature sensor 1068 is installed at a position further from the motor 1064 than the first temperature sensor 1067. Here, the distance in this case refers to a distance of a path along which heat is transferred in the housing 1061 due to thermal conduction. For example, the second temperature sensor 1068 is installed adjacent a middle region between an end of the housing 1061 and the motor 1064, as shown in FIG. 3. In the vicinity of the middle region, since relatively few other components are arranged, the temperature sensor is relatively easily installed.

The second temperature sensor is an example of a second temperature detection sensor that detects the temperature of a second portion further from the motor 1064 than the first portion of the optical scanning device 106.

Returning to FIG. 1.

The transfer belt 107 is, for example, an endless belt, and is rotatable by the operation of a roller. The transfer belt 107 rotates to convey the images transferred from each of the image forming sections to a position adjacent the transfer roller 108.

The transfer roller 108 includes two rollers facing each other. The transfer roller 108 transfers the images formed on the transfer belt 107 onto the image forming medium P passing between both rollers of the transfer roller 108 (referred to as secondary transfer).

The fixing section 109 heats and presses the image forming medium P onto which the toner image has been transferred. As a result, the image transferred onto the image forming medium P is fixed. The fixing section 109 comprises a heating section 110 and a pressure roller 111 facing each other.

The heating section 110 is, for example, a roller provided with a heat source for heating the heating section 110. The heat source is, for example, an inductive or other type heater. The roller heated by the heat source heats the image forming medium P.

Alternatively, the heating section 110 may include an endless belt held by a plurality of rollers. For example, the heating section 110 may include a plate-like heat source, an endless belt, a belt conveyance roller, a tension roller, and a press roller. The endless belt is, for example, a thin member. The belt conveyance roller drives the endless belt. The tension roller gives tension to the endless belt. An elastic layer is formed on the surface of the press roller. The plate-like heat source contacts the inner side of the endless belt on a heat generation portion side and is pressed towards the press roller. A fixing nip having a predetermined width is formed by the plate-like heat source and the press roller. Since the plate-like heat source acts as a portion of a nip area while also heating the nip area, responsiveness at the time of energization is higher than that in the case of a heating method using a halogen lamp.

The endless belt is formed by forming a silicone rubber layer having a thickness of 200 μm on an outer side of a SUS (stainless steel) base material having a thickness of 50 μm or a polyimide resin having a thickness of 70 μm, and an outermost periphery thereof is covered with a surface protective layer such as PFA (perfluoroalkoxy alkane) material. The press roller is formed by forming a silicone sponge layer having a thickness of 5 mm on a surface of a steel bar of 10 mm, and the outermost periphery thereof is covered with a surface protective layer such as PFA material.

In the plate-like heat source, for example, a glaze layer and a heat resistance layer are laminated on a ceramic substrate. In the plate-like heat source, a heat sink made of aluminum is bonded thereon to promote removal of excess heat to the opposite side and prevent warping of the substrate. The heat resistance layer is made of a known material such as $TaSiO_2$, for example, and is divided to have a predetermined length and number in a main scanning direction.

The pressure roller 111 presses the image forming medium P against the heating section 110.

The paper discharge tray 112 is a plate or the like to which the printed image forming medium P is discharged.

The duplex unit 113 permits the printing on a back surface of the image forming medium P when enabled. For example, the duplex unit 113 reverses the front and back surfaces of the image forming medium P by switching back the image forming medium P using a roller or the like.

The scanning section 114 reads an image from a document. The scanning section 114 is a scanner for reading an image from the document.

The scanner is of an optical reduction system including an image capturing element such as a CCD (charge-coupled device) image sensor, for example. Alternatively, the scanner may be of a CIS (contact image sensor) system including image capturing element such as a CMOS (complementary metal-oxide-semiconductor) image sensor. The scanner may be any other known system.

The document feeder 115 is also referred to as an ADF (auto document feeder), for example. The document feeder 115 conveys the documents placed on a document tray one after another. An image of the conveyed document is read by the scanning section 114. The document feeder 115 may be provided with a scanner for reading an image from a back surface of the document.

The control panel 116 includes a user interface for performing input and output of information between the image forming apparatus 100 and an operator of the image forming apparatus 100. The control panel 116 includes, for example, buttons and a touch panel for the operator to operate. For example, the touch panel is formed by laminating a display such as a liquid crystal display or an organic EL (Electro-Luminescence) display on a pointing device for input by touch. Accordingly, the button and the touch panel function as input devices for receiving an operation from the operator. The display of the touch panel functions as a display device for providing the operator with various kinds of information.

Figure 5:
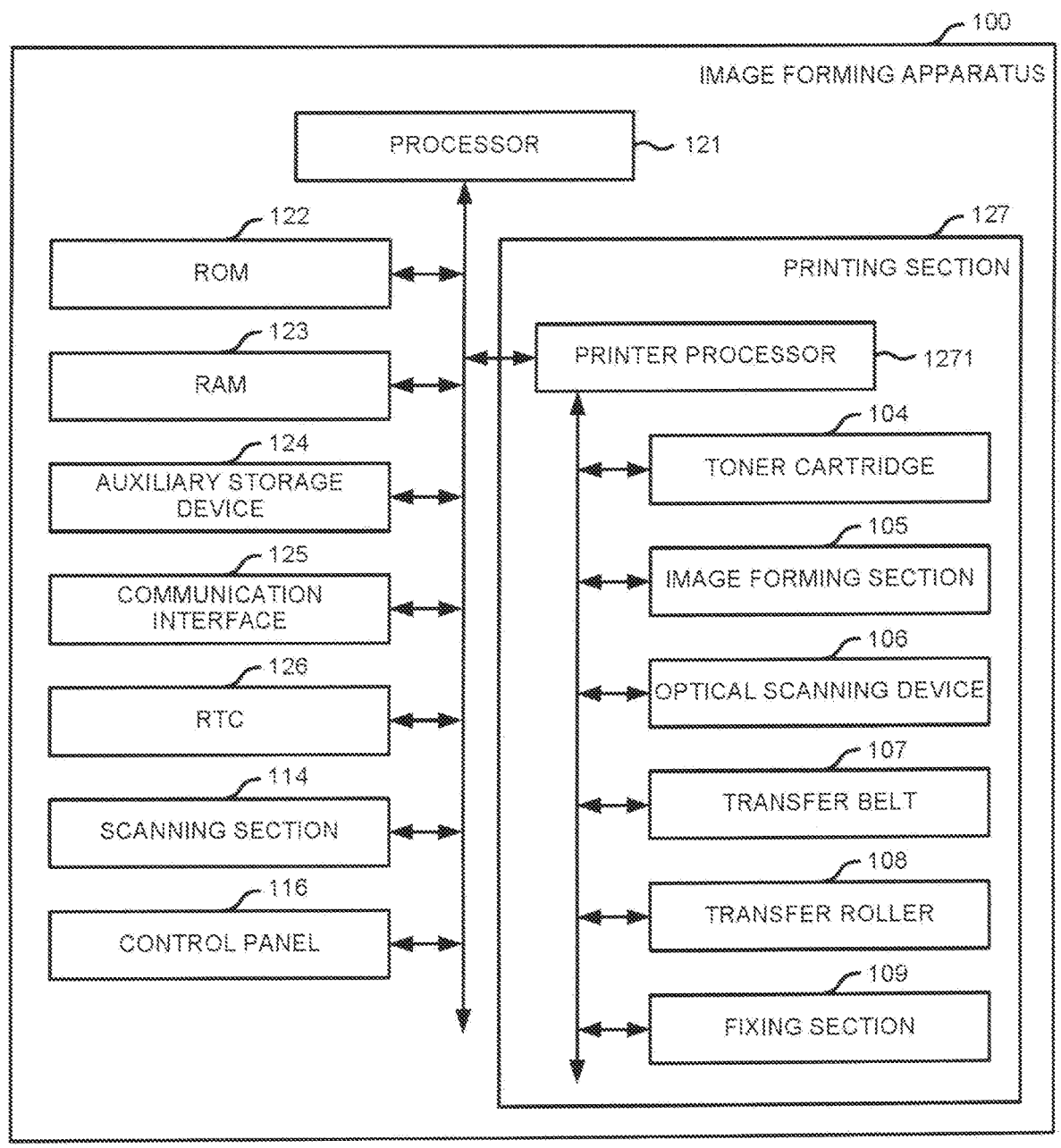
FIG. 5 schematically depicts an image forming apparatus according to a first embodiment and a second embodiment.

A circuit configuration of main portions of the image forming apparatus 100 is described with reference to FIG. 5. FIG. 5 is a block diagram illustrating the circuit configuration of main portions of the image forming apparatus 100.

For example, the image forming apparatus 100 includes a processor 121, a ROM (read-only memory) 122, a RAM (random-access memory) 123, an auxiliary storage device 124, a communication interface 125, a RTC (Real-Time Clock) 126, a printing section 127, the scanning section 114 and the control panel 116.

The processor 121 performs processing such as an arithmetic processing or a control processing necessary for the operation of the image forming apparatus 100. The processor 121 executes programs such as system software, application software or a firmware stored in the ROM 122 or the auxiliary storage device 124 to control each section to realize various functions of the image forming apparatus 100. The processor 121 is, for example, a CPU (Central Processing Unit), a MPU (Micro Processing Unit), an SoC (System on a Chip), a DSP (Digital Signal Processor), a GPU (Graphics Processing Unit), an ASIC (Application Specific Integrated Circuit), a PLD (Programmable Logic Device) or a FPGA (Field-Programmable Gate Array). Alternatively, the processor 121 may be a combination of the above components.

The ROM 122 is a read-only nonvolatile memory. The ROM 122 stores programs to be executed by the processor 121. The ROM 122 stores data used for the processor 121 to perform various processing or various setting values.

The RAM 123 is a memory used for reading and writing data. The RAM 123 is used as a so-called work area for storing data temporarily used by the processor 121 to perform various processing.

The auxiliary storage device 124 is, for example, an EEPROM (Electric Erasable Programmable Read-Only Memory), an HDD (Hard Disk Drive), an SSD (Solid State Drive), or the like. The auxiliary storage device 124 may store the programs executed by the processor 121. The auxiliary storage device 124 also stores data used by the processor 121 to perform various processing, data generated in the processing of the processor 121, or various setting values. The image forming apparatus 100 may include an interface into which a storage medium such as a memory card or a USB (universal serial bus) drive can be inserted in addition to or in place of the auxiliary storage device 124.

The programs stored in the ROM 122 or the auxiliary storage device 124 include a program for executing processing according to embodiments of the present disclosure. For example, an administrator of the image forming apparatus 100 causes these programs to be stored in the ROM 122 or the auxiliary storage device 124. However, in some examples, these programs are not initially stored in the ROM 122 or the auxiliary storage device 124 and an administrator or the like installs or loads these programs on the image forming apparatus 100. The program for executing the processing according to embodiments of the present disclosure may be transferred separately to the administrator and may be subsequently written into the ROM 122 or the auxiliary storage device 124 under the operation of the administrator or a service person. The transfer of the program may be realized by recording the program on a removable, non-transitory storage medium such as a magnetic disk, a magneto-optical disk, an optical disk, a semiconductor memory or the like, or by downloading the program via the network.

The communication interface 125 is an interface through which the image forming apparatus 100 communicates via the network or the like.

The RTC 126 is a circuit including a clock or providing a clock function.

The printing section 127 is used for printing an image on the image forming medium P or the like based on the image data. The printing section 127 includes, for example, a printer processor 1271, the toner cartridge (104C, 104M, 104Y, 104K), the image forming section (105C, 105M, 105Y, 105K), the optical scanning device 106, the transfer belt 107, the transfer roller 108 and the fixing section 109.

The printer processor 1271 performs processing such as an arithmetic processing and/or a control processing necessary for the printing operation of the image forming apparatus 100. The printer processor 1271 executes the arithmetic processing or the control processing necessary for the printing operation based on an instruction from the processor 121 and various programs. The printer processor 1271 outputs a processing result to the processor 121. Various programs for providing the functions of the printer processor 1271 may be stored in the ROM 122 or the auxiliary storage device 124, or some or all of the functions of the printer processor 1271 may be incorporated in a hardware circuit of the print processor 1271. Alternatively, various programs may be stored in a storage section of the printing section 127. The printer processor 1271 is, for example, a CPU, a MPU, a SoC, a DSP, a GPU, an ASIC, a PLD or a FPGA.

Figure 6:
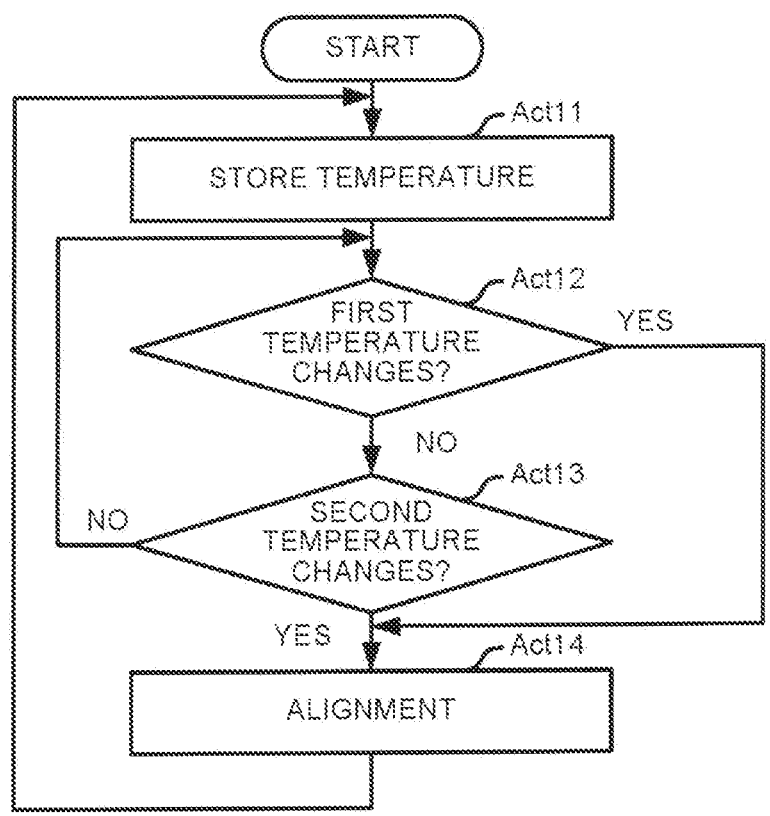
FIG. 6 is a flowchart depicting processing according to a first embodiment.

The operation of the image forming apparatus 100 according to an embodiment is described below with reference to FIG. 6. The content of the processing in the following operation description is merely an example, and various other processing operations capable of achieving the same result can be appropriately used. FIG. 6 is a flowchart depicting a processing executed by the processor 121. The processor 121 performs the processing by executing a program stored in the ROM 122 or the auxiliary storage device 124. In this description, when the processor 121 proceeds from one act to the next act by default or the like, the description for explaining this transition between different acts may be omitted.

When the processing shown in FIG. 6 is started, the processor 121 assigns a variable T1 and a variable T2 to the RAM 123 or the like.

In Act 11 in FIG. 6, the processor 121 acquires the temperature output from the first temperature sensor 1067 and the second temperature sensor 1068. Then, the processor 121 substitutes the temperature obtained from the first temperature sensor 1067 for the variable T1. The processor 121 substitutes the temperature obtained from the second temperature sensor 1068 for the variable T2. By this processing, when the temperature has already been previously substituted for the variables T1 and T2, the temperature is updated to the latest temperature. The processing in Act 11 is executed after executing alignment processing. Therefore, the variable T1 indicates the temperature output from the first temperature sensor 1067 after the alignment has been performed. Likewise, the variable T2 indicates the temperature output from the second temperature sensor 1068 after the alignment has been performed.

In Act 12, the processor 121 acquires the next temperature output from the first temperature sensor 1067. Here, the new temperature acquired here is referred to as a "first acquisition temperature T3". Then, the processor 121 determines whether or not a temperature difference exists between the first acquisition temperature T3 and the temperature indicated by the value of the variable T1 and satisfies a first condition. The first condition includes, for example, the following conditions indicated by [1-1] and [1-2].

[1-1] (T3−T1) is equal to or greater than a threshold value p1.

[1-2] (T1−T3) is equal to or greater than a threshold value p2.

The threshold value p1 and the threshold value p2 are positive numbers. Therefore, the condition [1-1] is satisfied when the temperature output from the first temperature sensor 1067 is rising. The condition [1-2] is satisfied when the temperature output from the first temperature sensor 1067 is decreasing. The threshold value p1 and the threshold value p2 may be fixed values or variable values determined according to functions of other values. For example, the threshold value p1 and the threshold value p2 may be determined based on the temperature T1. Alternatively, the threshold value p1 and the threshold value p2 may be determined based on the temperature T3. For example, when the temperature T1 is equal to or higher than a temperature t11 and lower than a temperature t12, the threshold value p1 is set to q11. Then, when the temperature T1 is equal to or higher than the temperature t12 and lower than a temperature t13, the threshold value p1 is set to q12. The same is applied to those subsequent to the temperature t13 and q13. Here, q11, q12, . . . are positive numbers and the relationship among value is that t11<t12<t13< . . . and q11≥q12≥ . . . . This relationship occurs because, in general, the higher the temperature T3 is, the greater the amount of color shift tends to become with respect to temperature change. In another example, if the temperature T1 is equal to or higher than the temperature t21 and lower than a temperature t22, the threshold value p2 is set to q21. Then, when the temperature T1 is equal to or higher than the temperature t22 and lower than a temperature t23, the threshold value p2 is set to q22. The same is applied to those subsequent to the temperature t23 and q23. Here, q21, q22, . . . are positive numbers and the relationship among values is that t21<t22<t23< . . . and q21≤q22≤ . . . . This relationship occurs because the higher the temperature T3 is, the greater the amount of color shift becomes with respect to temperature change.

The threshold value p1 and the threshold value p2 may be the same value. The threshold value p1 and the threshold value p2 are examples of the first threshold value. For example, if it is determined that the condition [1-1] or [1-2] is satisfied, the processor 121 determines that the first condition is satisfied.

If it is determined that the first condition is not satisfied, the processor 121 determines No in Act 12 and proceeds to the processing in Act 13.

In Act 13, the processor 121 acquires the next temperature output from the second temperature sensor 1068. Here, the subsequent temperature acquired is referred to as a "second acquisition temperature T4". Then, the processor 121 determines whether or not a temperature difference between the second acquisition temperature T4 and the temperature indicated by the value of the variable T2 satisfies a second condition. The second condition includes, for example, the following conditions indicated by [2-1] and [2-2].

[2-1] (T4−T2) is equal to or greater than a threshold value p3.

[2-2] (T2−T4) is equal to or greater than a threshold value p4.

The threshold value p3 and the threshold value p4 are positive numbers. Therefore, the condition [2-1] is satisfied when the temperature output from the second temperature sensor 1068 is rising. The condition [2-2] is satisfied when the temperature output from the second temperature sensor 1068 is decreasing. The threshold value p3 and the threshold value p4 may be fixed values or variables determined according to functions of other values. For example, the threshold value p3 and the threshold value p4 are determined based on the temperature T2. Alternatively, the threshold value p3 and the threshold value p4 may be determined based on the temperature T4. For example, when the temperature T4 is equal to or higher than a temperature t31 and lower than a temperature t32, the threshold value p3 is q31. Then, when the temperature T4 is equal to or higher than the temperature t32 and lower than a temperature t33, the threshold value p3 is q32. The same is applied to those subsequent to the temperature t33 and q33. Here, q31, q32, . . . are positive numbers. For example, the relationship among those values is that t31<t32<t33< . . . and q31≥q32≥ . . . . This relationship occurs because the higher the temperature T4 is, the greater an amount of color shift becomes with respect to temperature change. For example, if the temperature T4 is equal to or higher than a temperature t41 and lower than a temperature t42, the threshold value p4 is q41. Then, when the temperature T4 is equal to or higher than the temperature t42 and lower than the temperature t43, the threshold value p4 is q42. The same is applied to those subsequent to the temperature t43 and q43. Here, q41, q42, . . . are positive numbers. For example, the relationship among those values is that t41<t42<t43< . . . and q41≥q42≥ . . . . This is because the higher the temperature T4 is, the greater the amount of color shift becomes with respect to temperature change.

The threshold value p3 and the threshold value p4 may be the same value. For example, the threshold value p3 and the threshold value p4 are smaller than the threshold value p1 and the threshold value p2. This is because a change amount per unit time of the measured temperature by the second temperature sensor 1068 is often smaller than a change amount per unit time of the measured temperature by the first temperature sensor 1067. The threshold value p3 and the threshold value p4 are examples of the second threshold value. For example, if it is determined that the condition [2-1] or [2-2] is satisfied, the processor 121 determines that the second condition is satisfied.

If it is determined that the second condition is not satisfied, the processor 121 determines No in Act 13 and returns to the processing in Act 12. Thus, the processor 121 repeats the processing in Act 12 and Act 13 until the first condition or the second condition is satisfied.

If it is determined that the first condition is satisfied in the standby state of Act 12 and Act 13, the processor 121 determines Yes in Act 12 and proceeds to the processing in Act 14. If it is determined that the second condition is satisfied in the standby state in of Act 12 and Act 13, the processor 121 determines Yes in Act 13 and proceeds to the processing in Act 14.

In Act 14, the processor 121 executes alignment control for correcting the color shift.

The alignment control is a processing of adjusting the alignment of different toner images. The alignment is an operation for maintaining (e.g., adjusting or correcting) the superimposition accuracy of the images for plural colors (mainly for color printing). For example, the processor 121 controls the image forming sections (105C, 105M, 105Y, 105K) and the optical scanning device 106 to form an alignment pattern on the transfer belt 107. The alignment pattern formed on the transfer belt 107 is read by a sensor. The processor 121 acquires information output by the sensor. Then, the processor 121 detects a shift amount between the ideal alignment pattern stored in the auxiliary storage device 124 and the just read alignment pattern, and performs control to adjust the position or the angle of each mirror 1065, change an exposure timing and the like based on the shift amount to correct the color shift. The image forming apparatus 100 may perform alignment according to another method. The alignment control by the processor 121 is described, but practically, the alignment control is realized by the cooperation of the processor 121 and the printer processor 1271.

As described above, the processor 121 is an example of a control section that performs the alignment control.

After the processing in Act 14, the processor 121 returns to the processing in Act 11.

Figure 7:
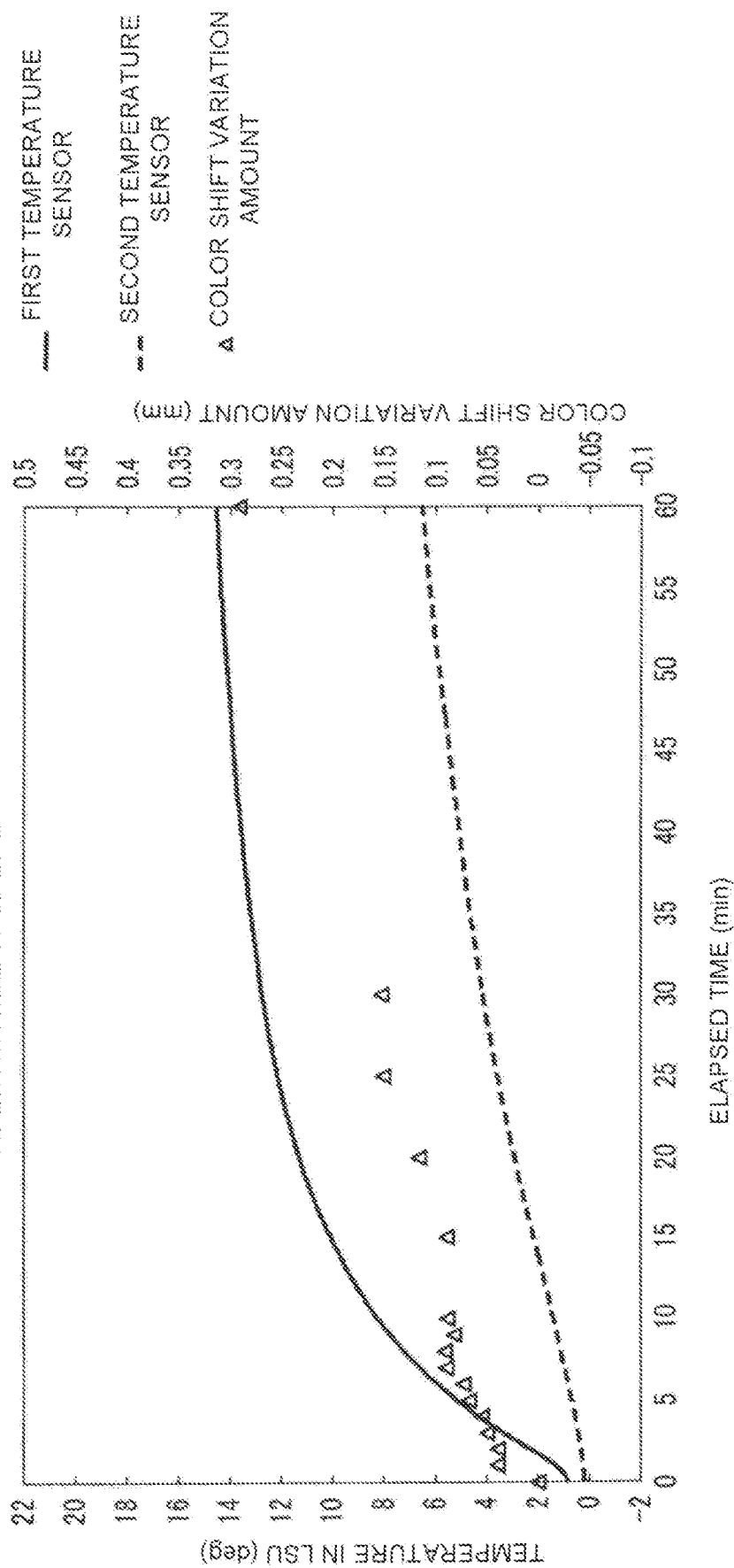
FIG. 7 is a graph illustrating aspects related to an execution timing of alignment.

The operation of the image forming apparatus 100 of the first embodiment is further described with reference to FIG. 7. FIG. 7 is a graph illustrating an execution timing of the alignment. Of course, FIG. 7 does not limit the scope of the present disclosure. FIG. 7 shows a temperature change of the optical scanning device 106 and a color shift variation amount when the image forming apparatus 100 continuously executes printing operations for one hour in a room at a room temperature of 23 C°. The color shift variation amount shown in FIG. 7 indicates a color shift variation amount when no color shift correction is performed. The color shift includes both the color shift in the main scanning direction and color shift in the sub scanning direction. In FIG. 7, only the greater one therebetween is shown. This also applies to the other graphs. As shown in FIG. 7, both the temperature measured by the first temperature sensor 1067 and the temperature measured by the second temperature sensor 1068 continuously rise. However, typically the temperature rise per unit time gradually decreases for the temperature measured by the first temperature sensor 1067. On the other hand, typically the temperature rise amount per unit time barely changes for the temperature measured by the second temperature sensor 1068. Therefore, for example, the image forming apparatus 100 performs the alignment when the first condition is satisfied after a relatively short time interval from the beginning of the printing operation. Over time, the time period between when the image forming apparatus 100 performs the alignment according to the first condition being satisfied becomes long. Even in this case, the temperature measured by the second temperature sensor 1068 still continuously rises. Therefore, the color shift variation amount also increases. In this case, before the first condition is satisfied, the second condition will be satisfied and the image forming apparatus 100 executes the alignment accordingly. As a result, in the image forming apparatus 100, an increase in the color shift variation amount can be suppressed as compared with a conventional image forming apparatus.

Figure 8:
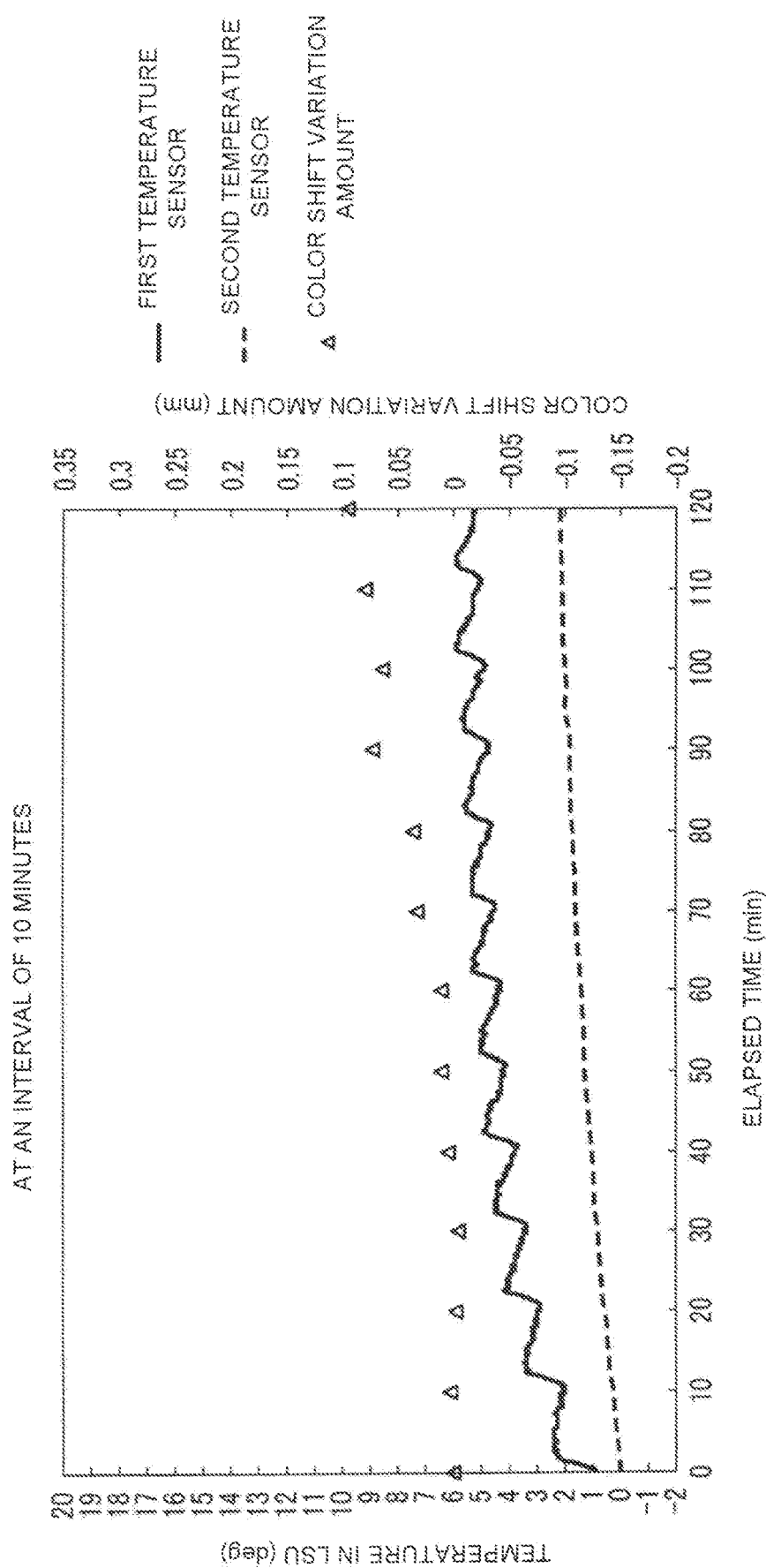
FIG. 8 is a graph illustrating additional aspects related an execution timing of alignment.

The operation of the image forming apparatus 100 according to the first embodiment is further described with reference to FIG. 8. FIG. 8 is a graph illustrating the alignment execution timing. Of course, FIG. 8 does not limit the scope of the present disclosure. FIG. 8 shows the temperature change of the optical scanning device 106, the color shift variation amount, and the like when the image forming apparatus 100 executes printing operations intermittently at an interval of 10 minutes in a room at room temperature of 23° C. The color shift variation amount shown in FIG. 8 indicates the color shift variation amount when no color shift correction is performed. As shown in FIG. 8, the temperature measured by the first temperature sensor 1067 repeatedly rises and falls at an interval of 10 minutes. The moving average of the measured temperature gradually increases. Compared with the case of FIG. 7, the increase in the temperature measured by the first temperature sensor 1067 is gentle. Therefore, compared with the case of FIG. 7, the time taken until the first condition is satisfied is long. However, the temperature measured by the second temperature sensor 1068 continuously rises, unlike the temperature measured by the first temperature sensor 1067. Therefore, the color shift variation amount also increases. The first condition will be more difficult to satisfy in this case as compared with the case of FIG. 7; however, it is easier to satisfy the second condition. As described above, in the image forming apparatus 100, an increase in the color shift variation amount is suppressed as compared with the conventional image forming apparatus.

The image forming apparatus 100 according to the first embodiment performs color shift correction when the temperature measured by the first temperature sensor 1067 installed near the motor 1064 reaches to a specified temperature or more. When the temperature measured by the second temperature sensor 1068 (installed at a position further from the motor 1064 than the first temperature sensor 1067) reaches the specified temperature or more, the image forming apparatus 100 according to the embodiment also performs the color shift correction. Thus, even when the temperature change becomes small after time for the portion close to the motor 1064 entering an approximately thermal equilibrium state, the temperature change of the portion far from the motor 1064 still remains large (measurable). This is because it takes a long time for the heat generated from the motor 1064 to transmit through the housing 1061. Furthermore, the influence of the outside air is higher for the portion further from the motor 1064 as compared with the portion near the motor 1064. Therefore, due to the influence of the outside air, there is a case in which the temperature of the portion far from the motor 1064 changes. Such a temperature change in the portion far from the motor 1064 also causes the color shift caused by deformation of the housing 1061. As described above, in the image forming apparatus 100 according to the first embodiment, the second temperature sensor 1068 also measures the temperature of the portion far from the motor 1064. Therefore, in the image forming apparatus 100 according to the first embodiment, it is also possible to correct the color shift caused the temperature change in not only the portion near the motor 1064 but also the portion far from the motor 1064. As a result, the image forming apparatus 100 of the first embodiment can suppress color shift better as compared with the conventional image forming apparatus.

Second Embodiment

Figure 9:
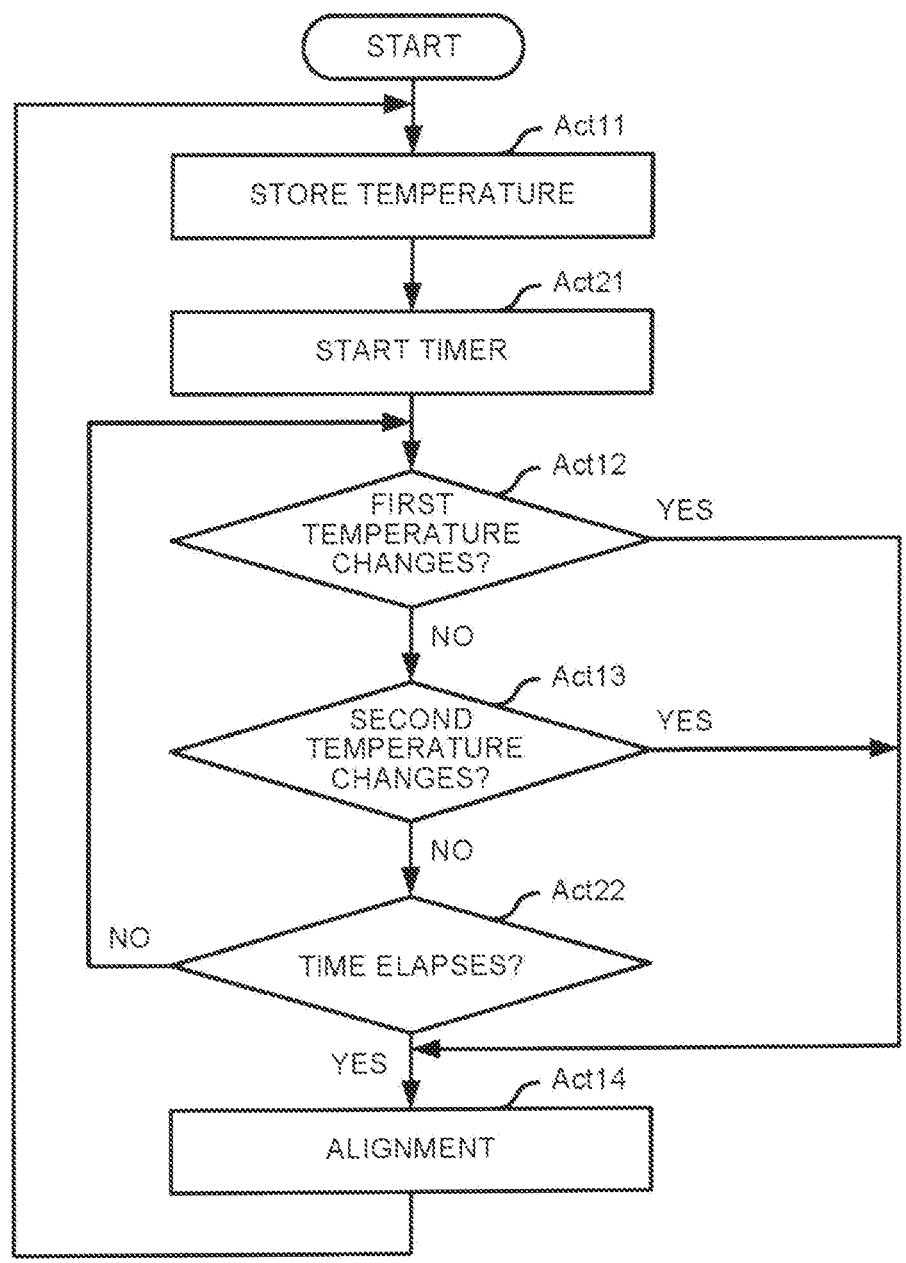
FIG. 9 is a flowchart depicting processing according to a second embodiment.

Since the configuration of the image forming apparatus 100 of the second embodiment is overall structurally similar to that of the first embodiment, the structural description is omitted. Hereinafter, the operation of the image forming apparatus 100 according to the second embodiment is described with reference to FIG. 9. The content of the processing in the following operation description is merely an example, and various processing capable of achieving the same result can be appropriately used. FIG. 9 is a flowchart depicting a processing performed by the processor 121. The processor 121 performs the processing by executing a program stored in the ROM 122 or the auxiliary storage device 124, for example. In FIG. 9, the processing similar to that in FIG. 6 is denoted with the same reference numerals.

When the processing shown in FIG. 9 is started, the processor 121 assigns the variable T1, the variable T2 and a variable TM to the RAM 123.

After the processing of Act 11 in FIG. 9, the processor 121 proceeds to the processing in Act 21.

In Act 21, the processor 121 starts (or resets) a timer. Specifically, for example, the processor 121 assigns a value indicating the current time to the variable TM. The current time is based on, for example, a time acquired from the RTC 126. After the processing in Act 21, the processor 121 proceeds to the processing in Act 12.

The processor 121 that controls the timer cooperates with the RAM 123 that stores the variable TM to operate as a measurement section that measures the time.

If the processor 121 determines No in the processing in Act 13, the processor 121 proceeds to the processing in Act 22.

In Act 22, the processor 121 determines whether or not a third condition is satisfied. For example, the processor 121 determines that the third condition is satisfied if the time counted since the timer started is equal to or greater than a threshold value pt. The threshold value pt is predetermined, for example, by the designer of the image forming apparatus 100. The threshold value pt is an example of a third threshold value. If it is determined that the third condition is not satisfied, the processor 121 determines No in Act 22 and returns to the processing in Act 12. Thus, the processor 121 repeats the processing in Act 12, Act 13 and Act 22 until one of the first condition, second condition, or the third condition is satisfied.

If the processor 121 determines that the first condition is satisfied in the standby state in Act 12, Act 13 and Act 22, the processor 121 determines Yes in Act 12 and proceeds to the processing in Act 14. If the processor 121 determines that the second condition is satisfied in the standby state in Act 12, Act 13 and Act 22, the processor 121 determines Yes in Act 13 and proceeds to the processing in Act 14. If the processor 121 determines that the third condition is satisfied in the standby state in Act 12, Act 13 and Act 22, the processor 121 determines Yes in Act 22 and proceeds to the processing in Act 14.

Figure 10:
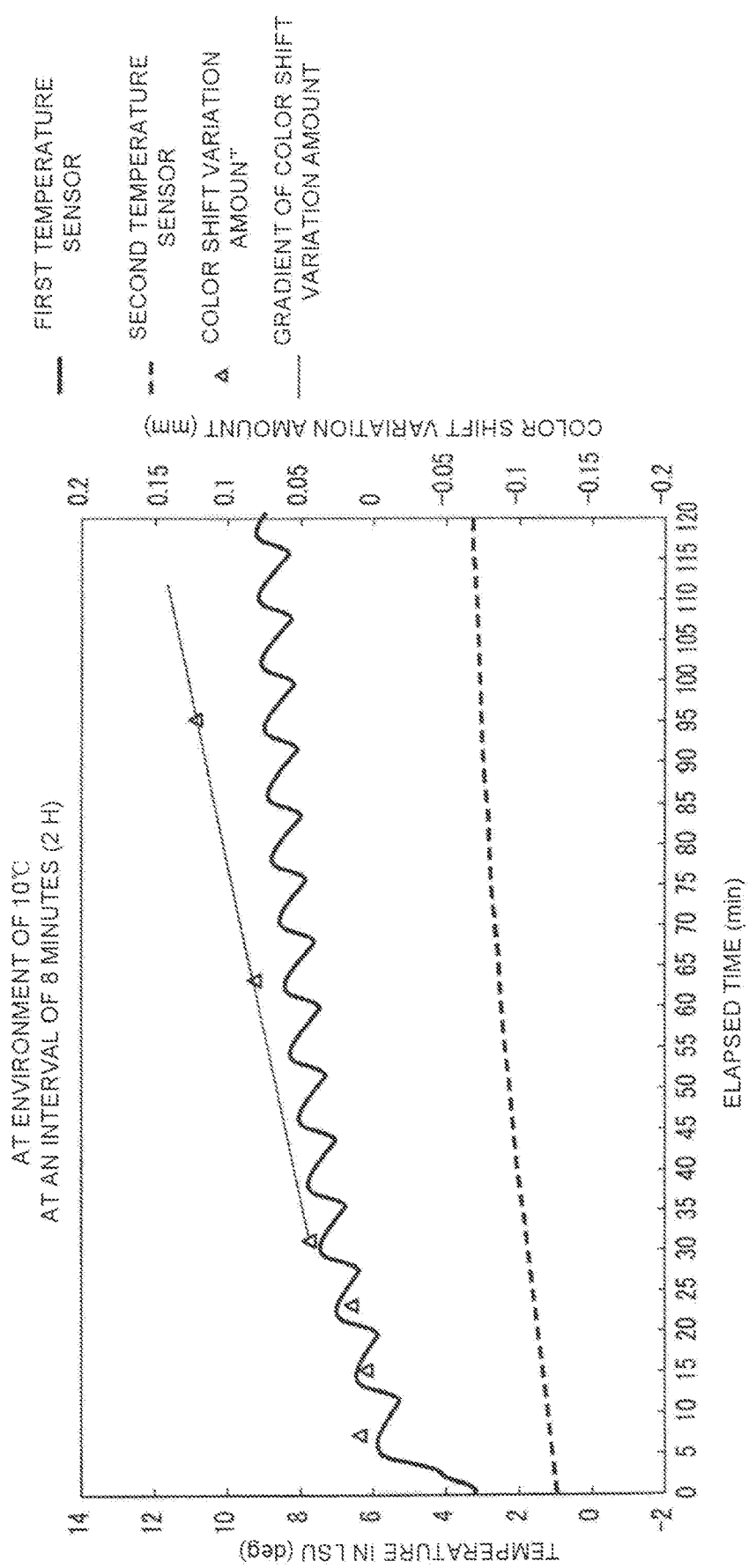
FIG. 10 is a graph illustrating aspects related to execution timing of alignment.

The operation of the image forming apparatus 100 according to the second embodiment is further described with reference to FIG. 10. FIG. 10 is a graph illustrating the execution timing of the alignment. Of course, FIG. 10 does not limit the scope of the present disclosure. FIG. 10 shows the temperature change of the optical scanning device 106 and the color shift variation amount when the image forming apparatus 100 performs the printing operation intermittently at an interval of 8 minutes in a room at room temperature of 10° C. The color shift variation amount shown in FIG. 10 indicates the color shift variation amount when no color shift correction is performed. For example, the threshold value pt under the third condition is 30 minutes. As shown in FIG. 10, the temperature measured by the first temperature sensor 1067 repeatedly rises and falls at an interval of 8 minutes. In the case of FIG. 10, the rise in the temperature measured by the first temperature sensor 1067 and the rise in the temperature measured by the second temperature sensor 1068 in the image forming apparatus 100 are both slower than those in the case of FIG. 8. Therefore, in the image forming apparatus 100, the first condition and the second condition may not be satisfied for 30 minutes or more. However, since the threshold value pt is 30 minutes, the third condition is eventually satisfied (after 30 minutes) and the image forming apparatus 100 performs the color shift correction. The gradient of the color shift variation amount from about 30 minutes to about 120 minutes is 0.00124 mm/minute, for example. The color shift variation amount between the time an alignment is performed until the next alignment is performed according to the third condition being satisfied (30 mins after the previous alignment) is 0.0394 mm. In comparison to the color shift variation amount from the time the previous alignment until the next alignment would be performed due the first condition or the second condition being satisfied is 0.0595 mm. As described above, it is can be known that the image forming apparatus 100 of the second embodiment can suppress the color shift even more than the image forming apparatus 100 of the first embodiment.

The image forming apparatus 100 of the second embodiment has the same effects as those of the image forming apparatus 100 of the first embodiment.

In the image forming apparatus 100 according to the second embodiment, the alignment is re-executed after a fixed time if not triggered by any other condition beforehand.

The first embodiment and the second embodiment described above can also be modified as follows.

The image forming apparatus may include three or more temperature sensors. Then, the image forming apparatus executes alignment when any one of the temperatures measured by one of the three or more temperature sensors reaches a predetermined threshold value or more.

The processor 121 may realize a part or all of the processing realized by executing the program in the above embodiments using a hardware configuration of the circuit.

In the above embodiments, a part of the processing performed by the processor 121 may instead be executed by other processors such as the printer processor 1271.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions, and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. An image forming apparatus, comprising:
   a first temperature detector configured to detect a temperature of a first portion of an optical scanning device of a printer unit, the first portion being proximate to a heat generating element;
   a second temperature detector configured to detect a temperature of a second portion of the optical scanning device, the second portion being farther from the heat generating element than the first portion; and
   a controller configured to perform alignment control for correcting a color positional shift of the printer unit when either a detected temperature change of the first portion is greater than or equal to a first threshold value or a detected temperature change of the second portion is greater than or equal to a second threshold value.

2. The image forming apparatus according to claim 1, further comprising:
   a timer, wherein
   the controller is further configured to perform the alignment control when a length of time since the alignment control was last performed, as measured by the timer, is greater than or equal to a third threshold value.

3. The image forming apparatus according to claim 1, wherein the controller is further configured to store the detected temperature from at least one of the first and second temperature detectors when the alignment control is performed.

4. The image forming apparatus according to claim 1, wherein the first threshold value is greater than the second threshold value.

5. The image forming apparatus according to claim 1, wherein
   the first temperature detector and the second temperature detector are inside a housing of the optical scanning device, and
   the second temperature detection section is in a middle region between the heat generation element and an end of the housing of the optical scanning device.

6. The image forming apparatus according to claim 5, wherein the second temperature detector comprises a thermistor.

7. The image forming apparatus according to claim 1, wherein the first temperature detector comprises a thermistor.

8. The image forming apparatus according to claim 1, wherein the first and second temperature detectors are thermistors.

9. The image forming apparatus according to claim 1, wherein the controller comprises a central processing unit.

10. The image forming apparatus according to claim 1, wherein the optical scanning device comprises:
    a housing; and
    a polygonal mirror inside the housing, wherein
    the heat generating element is a motor inside the housing and configured to rotate the polygonal mirror.

11. The image forming apparatus according to claim 10, wherein the optical scanning device further comprises:
    four laser units, each positioned to reflect a laser beam off the polygonal mirror.

12. A printing device, comprising:
    a laser scanning unit comprising:
      a housing;
      a polygonal mirror inside the housing;
      a motor inside the housing and configured to rotate the polygonal mirror;
      a first laser unit configured to emit a laser beam to form an electrostatic image on a first electrostatic drum;
      a second laser unit configured to emit a laser beam to form an electrostatic image on a second electrostatic drum;
      a first temperature sensor spaced from the motor at a first distance; and
      a second temperature sensor spaced from the motor at a second distance greater than the first distance;
    a first developing unit configured to develop the electrostatic image on the first electrostatic drum using a first type of toner;
    a second developing unit configured to develop the electrostatic image on the second electrostatic drum using a second type of toner;
    an intermediate transfer belt to which toner images developed on the first and second electrostatic drums are transferred in a positionally aligned manner; and
    a controller configured to correct positional alignment of the toner images transferred to the intermediate transfer belt when either a detected temperature change of the first portion is greater than or equal to a first threshold value or a detected temperature change of the second portion is greater than or equal to a second threshold value.

13. The printing device according to claim 12, further comprising:
    a timer, wherein
    the controller is further configured to perform the alignment control when a length of time since the alignment control was last performed, as measured by the timer, is greater than or equal to a third threshold value.

14. The printing device according to claim 13, wherein the first threshold value is greater than the second threshold value.

15. The printing device according to claim 12, wherein the first threshold value is greater than the second threshold value.

16. The printing device according to claim 12, wherein the laser scanning unit further comprises:
a third laser unit configured to emit a laser beam to form an electrostatic image on a third electrostatic drum; and
a fourth laser unit configured to emit a laser beam to form an electrostatic image on a fourth electrostatic drum.

17. A color positional shift correction method for an image forming apparatus, the method comprising:
receiving a first temperature detection signal from a first temperature sensor positioned to detect a temperature of a first portion of an optical scanning device of a printer unit, the first portion being proximate to a heat generating element;
receiving a second temperature detection signal from a second temperature sensor positioned to detect a temperature of a second portion of the optical scanning device, the second portion being farther from the heat generating element than the first portion; and
performing an alignment control for correcting a color shift of the printer unit when either a detected temperature change of the first portion is greater than or equal to a first threshold value or a detected temperature change of the second portion is greater than or equal to a second threshold value.

18. The method according to claim 17, wherein the heat generating element is a motor configured to rotate a polygonal mirror in the optical scanning device.

19. The method according to claim 17, wherein the first threshold value is greater than the second threshold value.

20. The method according to claim 17, further comprising:
performing the alignment control whenever an elapsed time from a most recent performance of the alignment control exceeds a fixed threshold.

* * * * *